United States Patent
Lee

(10) Patent No.: US 10,462,668 B2
(45) Date of Patent: *Oct. 29, 2019

(54) METHOD FOR FORMING A TRUST RELATIONSHIP, AND EMBEDDED UICC THEREFOR

(71) Applicant: KT CORPORATION, Seongnam-si (KR)

(72) Inventor: Jin Hyoung Lee, Seoul (KR)

(73) Assignee: KT CORPORATION, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,469

(22) Filed: Apr. 25, 2018

(65) Prior Publication Data

US 2018/0242153 A1 Aug. 23, 2018

Related U.S. Application Data

(63) Continuation of application No. 15/216,917, filed on Jul. 22, 2016, now Pat. No. 10,091,653, which is a continuation of application No. 14/356,037, filed as application No. PCT/KR2012/008970 on Oct. 30, 2012, now Pat. No. 9,426,654.

(30) Foreign Application Priority Data

Nov. 4, 2011 (KR) .................... 10-2011-0114603
Oct. 29, 2012 (KR) .................... 10-2012-0120292

(51) Int. Cl.
*H04W 12/06* (2009.01)
*H04L 29/06* (2006.01)
*H04W 12/00* (2009.01)

(52) U.S. Cl.
CPC ......... *H04W 12/06* (2013.01); *H04L 63/0823* (2013.01); *H04L 63/0853* (2013.01); *H04W 12/0023* (2019.01)

(58) Field of Classification Search
CPC ..... H04W 12/00; H04W 12/02; H04W 12/04; H04W 12/06; H04W 12/08; H04W 12/10; H04W 8/183; H04W 12/12; H04W 8/18; H04W 8/205; H04L 63/0823;
(Continued)

(56) References Cited

U.S. PATENT DOCUMENTS 8,296,836 B2    10/2012   Kolesnikov
8,347,361 B2    1/2013    Larsen
(Continued)

FOREIGN PATENT DOCUMENTS

KR    10-2002-0079349 A    10/2002
KR    10-2004-0106098 A    12/2004
(Continued)

OTHER PUBLICATIONS

International Search Report ISA210 for PCT/KR2012/008970 dated Mar. 25, 2013.
(Continued)

*Primary Examiner* — Magdi Elhag
(74) *Attorney, Agent, or Firm* — Sughrue Mion, PLLC

(57) ABSTRACT

The present invention relates to a method for forming a trust relationship among an MNO, an SM, and an eUICC in a communication system in which the SM is defined as an entity for managing the eUICC, as well as to an embedded UICC therefor.

18 Claims, 7 Drawing Sheets

(58) Field of Classification Search
CPC ... H04L 63/0853; H04L 63/20; H04L 67/306; H04L 9/0891; H04M 1/72522; H04M 1/66
See application file for complete search history.

(56) References Cited

U.S. PATENT DOCUMENTS

| | | | |
|---|---|---|---|
| 8,375,207 B2* | 2/2013 | Dangoor | H04L 63/062 713/168 |
| 8,510,553 B2 | 8/2013 | Adrangi et al. | |
| 9,049,597 B2 | 6/2015 | Belrose et al. | |
| 9,385,862 B2 | 7/2016 | Escott et al. | |
| 9,426,654 B2 | 8/2016 | Lee | |
| 10,091,653 B2* | 10/2018 | Lee | H04W 12/06 |
| 2007/0037555 A1 | 2/2007 | Lee et al. | |
| 2009/0028059 A1 | 1/2009 | Barbaresi et al. | |
| 2009/0209232 A1 | 8/2009 | Cha et al. | |
| 2010/0197350 A1 | 8/2010 | Jeung | |
| 2012/0108205 A1* | 5/2012 | Schell | H04L 63/0823 455/411 |
| 2012/0135710 A1 | 5/2012 | Schell et al. | |
| 2012/0297474 A1* | 11/2012 | Zhang | H04L 63/0823 726/10 |
| 2012/0324225 A1* | 12/2012 | Chambers | H04L 9/0891 713/169 |
| 2014/0141763 A1 | 5/2014 | Suh et al. | |

FOREIGN PATENT DOCUMENTS

| | | |
|---|---|---|
| KR | 10-2005-0074430 A | 7/2005 |
| KR | 10-2011-0020783 A | 3/2011 |

OTHER PUBLICATIONS

International Written Opinion ISA237 for PCT/KR2012/008970 dated Mar. 25, 2013.
Non-Final Office Action dated Nov. 13, 2015 in U.S. Appl. No. 14/356,037.
Notice of Allowance dated Apr. 14, 2016 in U.S. Appl. No. 14/356,037.

* cited by examiner

METHOD FOR FORMING A TRUST RELATIONSHIP, AND EMBEDDED UICC THEREFOR

CROSS-REFERENCE TO RELATED APPLICATIONS

This application is a continuation of U.S. application Ser. No. 15/216,917, filed Jul. 22, 2016, which is a continuation of U.S. application Ser. No. 14/356,037, filed May 2, 2014, now U.S. Pat. No. 9,426,654, issued Aug. 23, 2016, which is a National Stage application under 35 U.S.C. § 371 of PCT/KR2012/008970 filed on Oct. 30, 2012 in the United States Patent and Trademark Office, which claims priority to Korean Patent Application Nos. 10-2012-0120292 and 10-2011-0114603, filed on Oct. 29, 2012 and Nov. 4, 2011, respectively, in the Korean Patent Office, the disclosures of which are incorporated herein by reference in their entireties.

TECHNICAL FIELD

The present invention relates to a method for forming a trust relationship among entities in a communication system including an embedded UICC and an embedded UICC for the same.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently user the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

As described above, as opposed to the conventional removable SIM, an embedded UICC (hereinafter, referred to as 'eSIM' or 'eUICC') has many issues such as an authority of opening, an initiative on value-added services, security of subscriber information, etc. due to differences of its physical structure. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eUICC. The SM means an entity or a function/role of performing overall managements on the eUICC such as issuing profiles ('Operator Credentials', 'Profile'), and processing a procedure of subscription change, etc. Recently, the GSMA proposed a structure in which the SM is divided into a SM-Data Preparation (SM-DP) performing a role of generating operator information and a SM-Secure Routing (SM-SR) performing a role of direct delivery of the operator information. Although trust relationships between entities, that is, 'Circle of Trust' have been proposed in order to enhance overall reliability of eSIM, a technical solution achieving them does not exist yet.

Therefore, a solution for forming trust relationships between entities in an eSIM environment proposed by the GSMA is provided in the present invention.

DISCLOSURE

Technical Problem

The present invention provides a method for forming trust relationships of each entity or between entities in a communication system including an embedded UICC.

The present invention also provides a method for forming trust relationships of each entity or between entities in a communication system in which a SM is defined as an entity for managing an eUICC.

The present invention also provides a method for forming trust relationships of an entity or between entities such as a MNO, a SM, an eUICC, and a terminal in a communication system in which a SM is defined as an entity for managing an eUICC.

The present invention also provides a method for using trust information which specially defined for forming trust relationships of an entity or between entities such as a MNO, a SM, an eUICC, and a terminal in a communication system in which a SM is defined as an entity for managing an eUICC.

Technical Solution

An aspect of the present invention provides a method for forming a trust relationship between an embedded Universal Integrated Circuit Card (eUICC) and a Subscription Manager-Secure Routing (SM-SR), the method comprising: a verification information generating step generating, by the eUICC, verification information based on transferred or shared trust information; a verification information exchanging step transmitting, by the eUICC, the verification information to the SM-SR as information to be used for the SM-SR to authenticate the eUICC, and receiving verification information generated by the SM-SR from the SM-SR; and a verification information verifying step authenticating, by the eUICC, the SM-SR by verifying the verification information received from the SM-SR based on the corresponding trust information.

Another aspect of the present invention provides an embedded Universal Integrated Circuit Card (eUICC) for forming a trust relationship with a Subscription Manager-Secure Routing (SM-SR), the eUICC comprising: a verification information generating part generating, by the eUICC, verification information based on transferred or shared trust information; a verification information exchanging part transmitting, by the eUICC, the verification information to the SM-SR as information to be used for the SM-SR to authenticate the eUICC, and receiving verification information generated by the SM-SR from the SM-SR; and a verification information verifying part authenticating, by the eUICC, the SM-SR by verifying the verification information received from the SM-SR based on the corresponding trust information.

Other aspect of the present invention provides a method for forming a trust relationship between a plurality of entities in a communication system, the method comprising: generating, by each of the plurality of entities, verification information based on transferred or shared trust information; exchanging, by each of the plurality of entities, the generated verification information reciprocally by transmitting the generated verification information respectively to a counterpart entity; and authenticating, by each of the plurality of entities, the counterpart entity by verifying the verification information transferred from the counterpart entity based on the corresponding trust information so as to form the trust relationship between the plurality of entities.

Still other aspect of the present invention provides a method for forming a trust relationship, the method comprising: a step of forming a trust relationship between an embedded Universal Integrated Circuit Card (eUICC) and a Subscription Manager-Secure Routing (SM-SR), wherein each of the eUICC and the SM-SR generates verification information based on transferred or shared trust information, transmits the generated verification information to a counterpart, and authenticates the counterpart by verifying verification information received from the counterpart based on the corresponding trust information; a step of forming a trust relationship between the SM-SR and SM-SR, wherein each of the SM-SR and the SM-SR generates verification information based on transferred or shared trust information, transmits the generated verification information to a counterpart, and authenticates the counterpart by verifying verification information received from the counterpart based on the corresponding trust information; and a step of forming a trust relationship between the SM-SR and a Subscription Manager-Data Preparation (SM-DP), wherein each of the SM-SR and the SM-DP generates verification information based on transferred or shared trust information, transmits the generated verification information to a counterpart, and authenticates the counterpart by verifying verification information received from the counterpart based on the corresponding trust information.

MODES OF THE INVENTION

Figure 1:
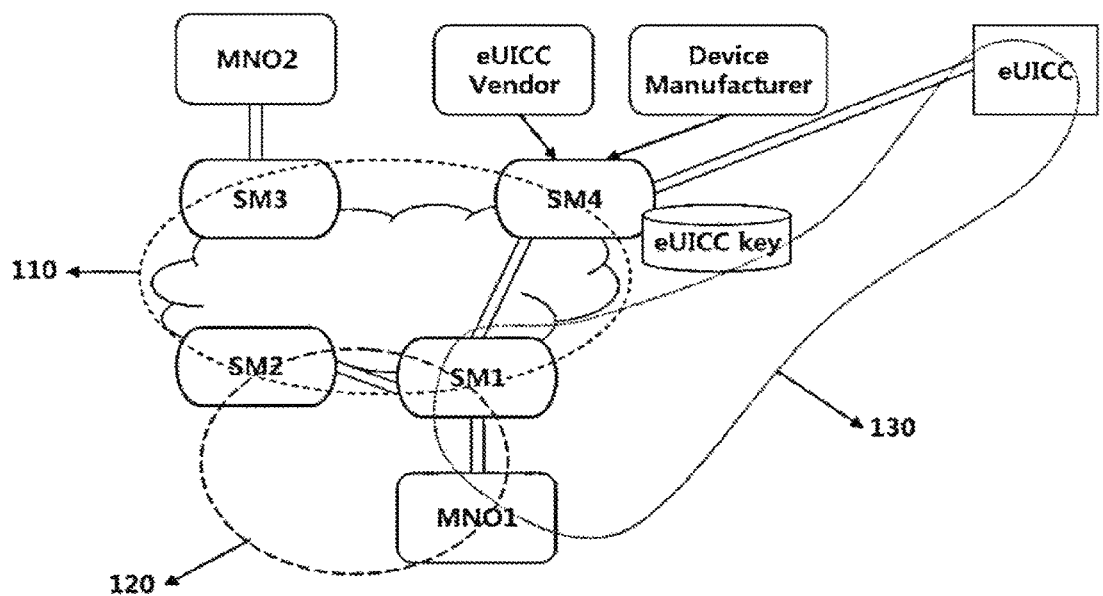
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, the present invention provides a method for managing an eSIM by utilizing generation of dynamic key (public key, etc.) in an environment of SM role separation proposed by the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between a MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

A 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by a MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (a MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of a MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in a MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of a MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by a MNO or a third-party organization. If they are provided by a third-party organization, there may be a commercial relationship between the SM and the MNO.

For managing subscriptions, the SM does not have any direct relationships with subscribers of a MNO. Although a MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by a MNO. Or, a MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by a MNO.)

3) Calculating an OTA package for downloading by the SM-SR

If the functions of the SM-DP are provided by a third-party organization, security and trust relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, a MNO, and may be used by a MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
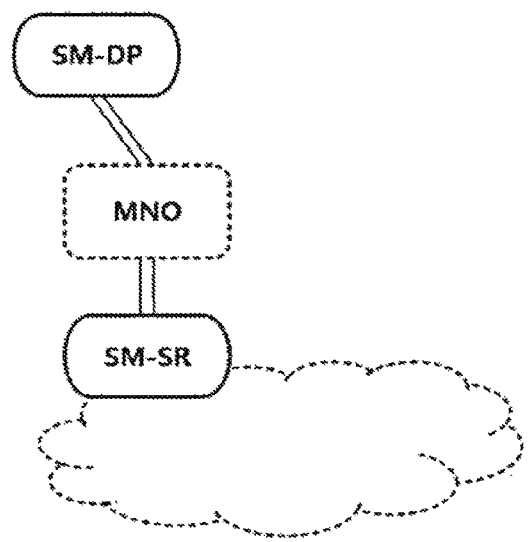
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of a MNO, a provisioning profile, etc.) and a SM-SR for routing them. Also, the SM-SR may interwork with other multiple SM-SRs with trust relationships, and the SM-DP may interwork with a MNO system.

Of course, arrangement of the SM-DP and the MNO system may be implemented differently from the case of FIG. 2. That is, the SM-DP may interwork with the SM-SR, and the MNO system may interwork with the SM-DP.

Figure 3:
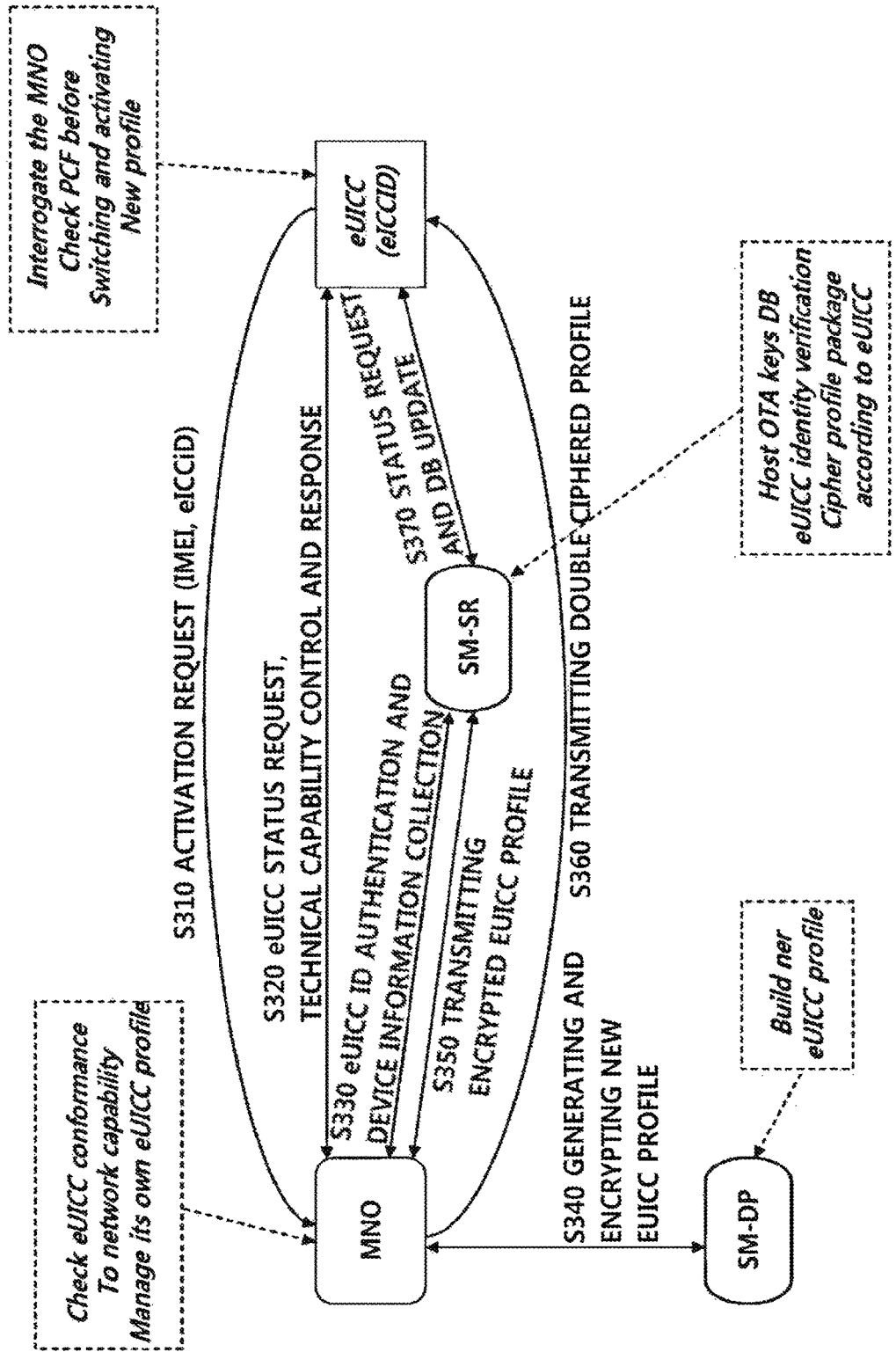
FIG. 3 is a flow chart to explain a provisioning procedure corresponding to a first subscription in a system to which the present invention is applied.

FIG. 3 is a flow chart to explain a provisioning procedure corresponding to a first subscription in a system to which the present invention is applied.

In the provisioning procedure, an eUICC may transmit an activation request including device identity information (such as IMEI, etc.) and eUICC identity information (such as eICCid, etc.) to a MNO (at S310). Then, a request of an eUICC status and request/confirmation of a technical capability control are performed (at S320).

Also, although not illustrated in FIG. 3, a step, in which the eUICC provides its public key (PK) or key information of PKI (information about a key generation algorithm, a key length, a key generation manner, etc.) to a corresponding MNO system or a SM-SR, may be included in the step S320.

In the step S330, the MNO may verify an identity of the eUICC and collect information about the eUICC by cooperating with the SM-SR. In the step S330, the MNO may obtain an encryption key for the eUICC, specifically, a public key corresponding to the eUICC from the SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

Figure 8:
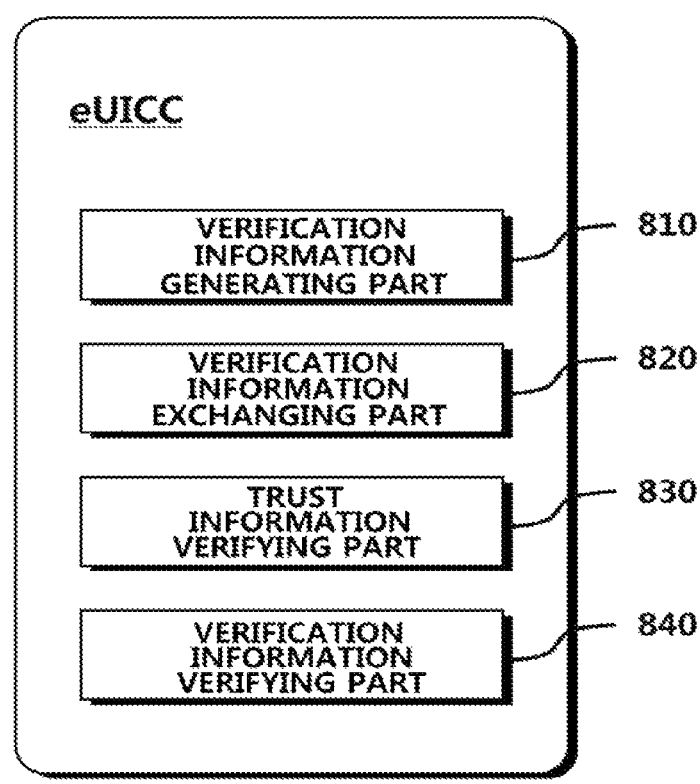
FIG. 8 is a block diagram illustrating an eUICC for forming a trust relationship between an eUICC and a SM-SR among formation of trust relationships between entities in an eUICC environment according to an example embodiment of the present invention.

The dynamic procedure of obtaining the encryption key, which will be explained by referring to FIGS. 8 and 9, is that a SM-SR requests the eUICC to transmit a public key when there is a request (including identity information of the specific eUICC) from a MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, and so on. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S340; a first encryption step). At this time, the SM-DP may generate an additional electronic signature by using its private key in order to provide authenticity. That is, the SM-DP may make an electronic signature on the profile by using its private key for authentication (at S340).

Then, the MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S350).

Then, the MNO may transmit the double ciphered eUICC profile to the corresponding eUICC (at S360). At this time, the public key of the SM-DP or a certification may be transmitted to the eUICC with the eUICC profile in order to provide authenticity.

Since the eUICC already knows the eUICC management key, the eUICC may completely decode the profile to be used for a provisioning by performing a second decoding using the private key corresponding to its public key after the first decoding. The private key is already known in the manufacturing step or from the dynamic generation procedure as explained above. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S370, the SM-SR database may be updated based on status requests and corresponding responses between the eUICC which finished the provisioning and the SM-SR.

Main configurations for the above-described steps are explained as follows.

In the step S310, the eUICC identity information (eICCid, etc.) is open data, and integrated and protected in the eUICC.

In the steps S320 and S330, the status request and the technical capability control may provide verification on the eUICC identity (that is, verification on whether the eUICC is trustable or not), and should be able to verify a feasibility of a characteristic of the eUICC for a MNO service.

In the steps S340 to S360, a double ciphering mechanism is used for generating and transmitting the eUICC profile. In other words, the profile which is linked to the eUICC by the SM-DP is ciphered by a ciphering mechanism which can be read by the target eUICC. Also, an electronic signature may be made by the SM-DP for verifying that the profile has been generated by the right SM-DP. Also, the SM-SR may encrypt the generated profile using the eUICC management key so as to authenticate and protect the profile during delivery.

In the step 370, the SM-SR database may be updated at a final stage of the subscription installation.

Figure 4:
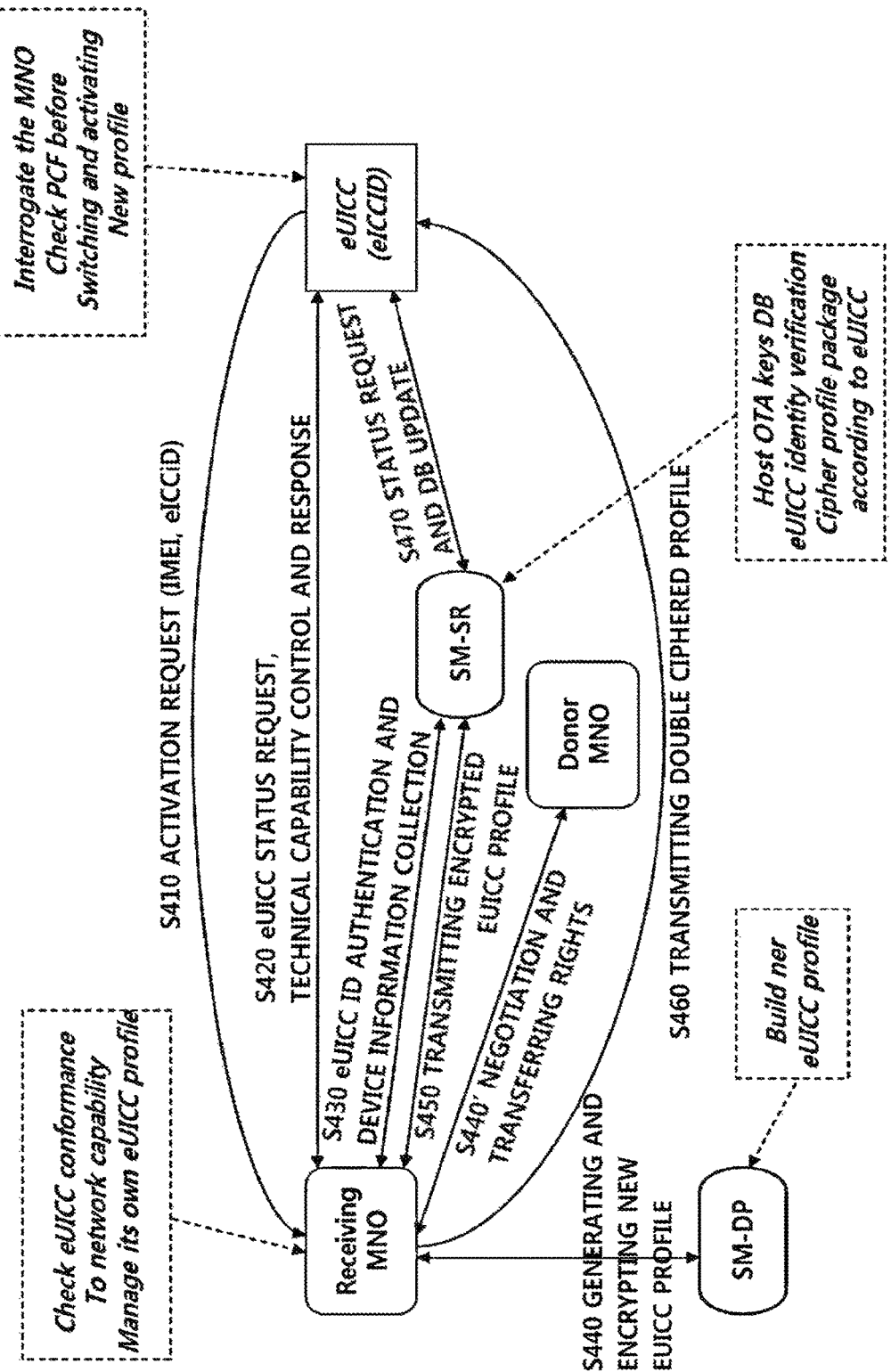
FIG. 4 is a flow chart explaining a procedure for subscription change or MNO change to which the present invention is applied.

FIG. 4 is a flow chart explaining a procedure for subscription change or MNO change to which the present invention is applied.

Generally, the procedure of FIG. 4 is similar to the provisioning procedure of FIG. 3. That is, a new MNO of FIG. 4, after changed, corresponds to a MNO of FIG. 3. The difference between two procedures is that the new MNO performs a procedure of negotiating and transferring right with a donor MNO before or after generation of a profile for the new MNO (at S440').

That is, the difference between a MNO change procedure of FIG. 4 and the provisioning procedure of FIG. 3 is that an activation request is transmitted using a provisioning profile or an operational active profile through a donor MNO OTA bearer, and the new MNO requests a path from the SM-SR in order to download a new profile through one of OTA and OTI.

The MNO change procedure of FIG. 4 is explained in detail as follows.

For changing a MNO, an eUICC may transmit an activation request including device identity information (IMEI, etc.) and eUICC identity information (eICCid, etc.) to a receiving MNO which is to be changed (at S410). Then, an eUICC status request and a technical capability control are performed between the receiving MNO and the eUICC (at S420).

Also, although not illustrated, as illustrated in the following description, the step S420 may include a step that the eUICC provides its pubic key or PKI key information which is profile access credential information (key generation algorithm, a key length, a key generation method, etc.) to the corresponding MNO system or SM-SR similarly to the step S320 for provisioning.

In a step S430, the receiving MNO may perform an eUICC identity verification and collect information about the device (eUICC) by interworking with the SM-SR. Also, according to an example embodiment of the present invention, the MNO may obtain an encryption key for the corresponding eUICC, specifically, a public key corresponding to the eUICC from a SM-SR.

Here, according to a policy for eUICC, a single security module may be installed in an eUICC in the manufacturing step or after the manufacturing step of the eUICC. Or, a plurality of security modules may be installed in an eUICC according to a policy for eUICC or a policy for each MNO.

The receiving MNO which obtained the public key (the encryption key) of the corresponding eUICC generates a new eUICC profile corresponding to the MNO through the SM-DP, encrypts the profile by using the obtained public key (the encryption key), and delivers the profile to the MNO (a first encryption; S440). At this time, the SM-DP may generate an additional electronic signature using its private key in order to provide authenticity. That is, in the step S440, the SM-DP may make an electronic signature on the profile by using its private key or secret key for authentication.

Also, a step S440' of negotiating and transferring right may be performed before or after the step S440. This step S440' is a procedure in which the receiving MNO requests the previous MNO (the donor MNO) to verify whether the eUICC is right or not and to transfer rights (information) according to the change of MNO.

In other words, in the step S440', the new receiving MNO may request authentication on the donor MNO for the subscription switching, and this authentication may be provided through a policy control function.

Then, the receiving MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S450).

Then, the MNO may transmit the double ciphered eUICC profile to the corresponding eUICC (at S460). At this time, the public key of the SM-DP or a certification may be transmitted to the eUICC with the eUICC profile in order to provide authenticity.

Since the eUICC already knows the eUICC management key, the eUICC may completely decode the profile to be used for change of MNO by performing a second decoding using the private key corresponding to its public key after the first decoding. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

It the step S470, the SM-SR database may be updated based on status requests and corresponding responses between the eUICC which finished the provisioning and the SM-SR.

The above methods in FIGS. 1 to 4 will be explained again as follows.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as a connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, an applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key. In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc. the GSMA proposed a structure of a 'Circle of Trust' which has a concept that an end-to-end trusted relation between an MNO and an eSIM is established based on overlapped trusted relations between each similar entity and entities. That is, a first MNO MNO1 forms a trusted relation with a first SM SM1, the first SM SM1 forms a trusted relation with a fourth SM SM4, and the fourth SM SM4 forms a trusted relation with the eSIM. Accordingly, the trusted relation between the MNO and the eSIM may be established.

Thus, the environment of SM role separation proposed in the GSMA may give appropriate flexibility and securing business initiative to the eSIM environment. That is, the flexibility can be achieved since all MNOs assign a role of interworking with other MNOs to a SM-SR. Also, the business initiative can be secured since a MNO generally may be responsible for a role of the SM-DP, and operator information of communication and value-added services may be built by the SM-DP.

However, although a technical solution for forming trust relationship between entities in the eSIM structure such as MNO, SM, eUICC, a terminal, etc., it does not exist currently.

Therefore, in an example embodiment of the present invention, a method for forming trust relationship between entities in the proposed eSIM structure is proposed.

However, the present invention is not restricted to the procedures for provisioning or changing MNO which were described in FIG. 3 and FIG. 4. If trust relationship between entities related to an eUICC can be established by using trust information defined in the present invention, the present invention may be applied to various environments or systems.

Figure 5:
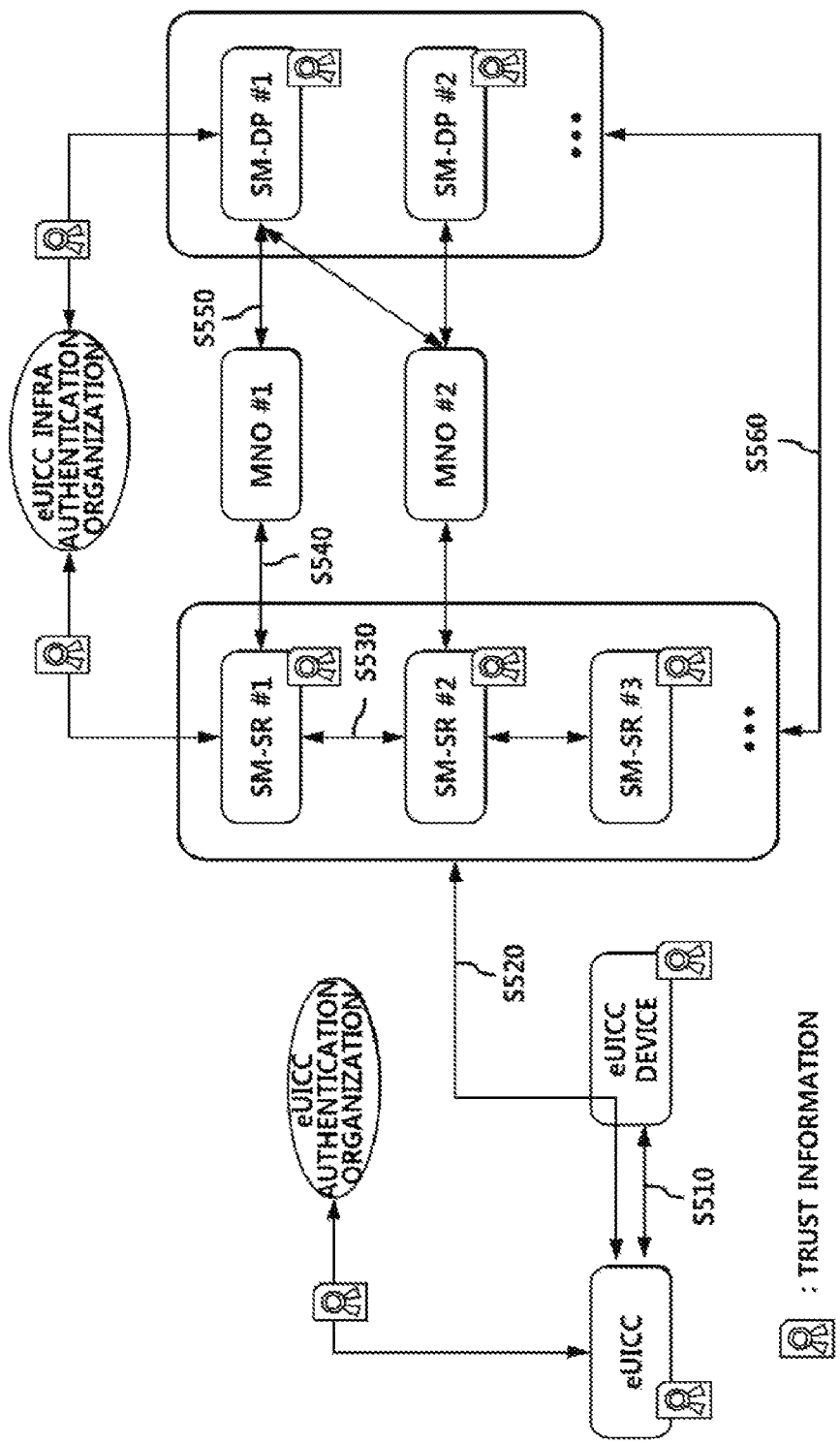
FIG. 5 illustrates an example of forming trust relationship between entities in an eUICC environment according to an example embodiment of the present invention.

FIG. 5 illustrates an example of forming trust relationship between entities in an eUICC environment according to an example embodiment of the present invention.

In the present invention, the entities participating the eSIM structure may be an eSIM, a device equipped with the eSIM, a SM (SM-SR, SM-DP, etc.), and a MNO. In addition, other entities may be included in the eSIM structure.

Among entities, the SM (SM-SR, SM-DP, etc.) corresponding to the eUICC infrastructure may store trust information (for example, certificates, etc.) generated by a trusted organization in a security apparatus such as a Hardware Security Module (HSM). The eUICC and device equipped with the eUICC may store trust information (for example, certificates, etc.) within each entity (not in a separate apparatus such as HSM, etc.). Trust between each of entities may be formed by establishing security communication channels (for example, TLS/SSL, etc.) between entities based on the trust information.

The 'trust information' assigned to each entity is a result of certification on the corresponding entity, which is technically assigned. That is, it means that a verification result on the eSIM itself such as common criteria (CC) according to a security verification standard or organization is received also as security information in digital format (for example, a security key (symmetric-key), a certificate, etc.), which can be stored within the eSIM in addition to document format.

The 'trust information' in the present invention may adopt a format such as a certificate, a security key, token information, etc. as digital information assigned to an entity having a right to participate a trust relationship. Also, they may also be referred to as security information, certification information, token information, etc.

'Verification information' in the present invention may be referred to as certification information, token information, electronic signature, MAC, etc. as digital information generated with a purpose of certificating each entity via the trust information.

As an example of generating such the verification information, a hash function computation may be performed with inputs of shared trust information and inputs of arbitrary information such as random number or identity information which can be made public. In this case, information transmitted to a counterpart entity may be the generated random number or the identity information and a result value of the hash function. The counterpart entity which received the information may check whether the verification information is generated in the entity to form a trust relationship with itself or not by performing identical computation with the transferred random number or the identity information and the shared trust information.

As another example of generating the verification information, if the verification information is a certificate, an entity may generate the verification information by performing electronic signature on arbitrary information such as a random number or identity information which can be made public with its private key (corresponding to security information). Then, the entity may transmit the generated verification information to a counterpart entity, and the counterpart entity may verify the verification information based on the electronic signature by utilizing a certificate transferred together or opened so as to check whether the verification information is generated in the entity to form a trust relationship with itself or not.

In FIG. 5, an eUICC certification organization and an eUICC infrastructure certification organization may be integrated or separated.

Figure 6:
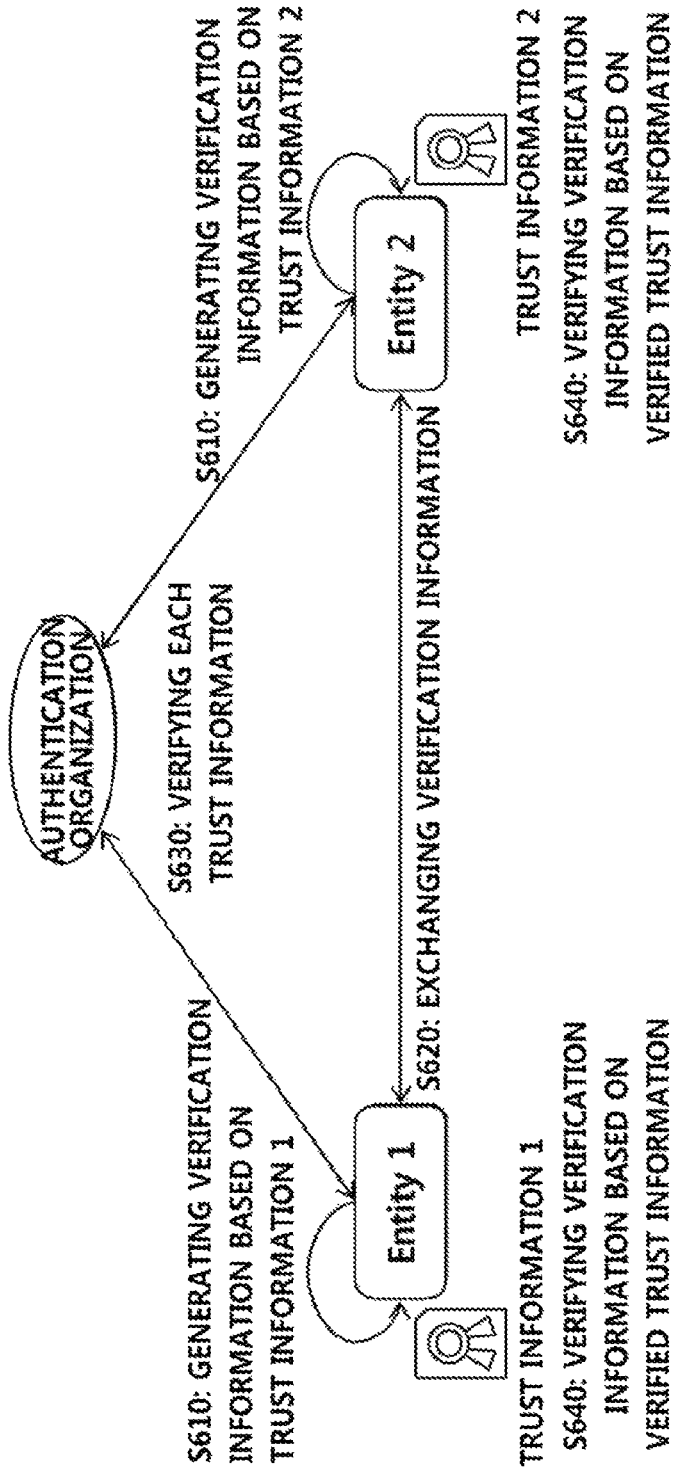
FIG. 6 illustrates an example of forming trust relationships between entities in an eUICC environment according to an example embodiment of the present invention.

FIG. 6 illustrates an example of forming trust relationships between entities in an eUICC environment according to an example embodiment of the present invention.

The operations of the present invention may explain a flow represented by each arrow mark based on a structure illustrated in FIG. 5. The basic trust relationship between each of entities, in the present invention, nay be formed as shown in FIG. 6.

Referring to FIG. 6, a method for forming trust relationship between a plurality of entities (a first entity and a second entity) in a communication system may comprise a step S610 of generating verification information by each of the entities based on transferred or shared trust information; a step S620 of exchanging the generated verification information reciprocally by transmitting the generated verification information to a counterpart entity; and a step S640 of verifying the verification information received from the counterpart entity by each of the entities based on the corresponding trust information, authenticating the counterpart entity, and forming the trust relationship between the entities.

In the step S610, the first entity generates verification information based on transferred or shared trust information (first trust information), and the second entity generates verification information based on transferred or shared trust information (second trust information).

In the step S620, the first entity transmits the verification information generated by it to a counterpart entity (the second entity), and the second entity transmits the verification information generated by it to a counterpart entity (the first entity). That is, the first entity and the second entity exchange verification information reciprocally.

In the step S620, a plurality of entities (the first entity and the second entity) may transmit the trust information together with the verification information to the each counterpart entity when the trust information is a certificate.

In this case, the method for forming trust relationship between a plurality of entities may further include, after the step S620, a step S630 of performing verification on the trust information by asking an authentication organization which issued the trust information about validity and reliability of the trust information received from the counterpart entity. That is, the first entity verifies the trust information (the second trust information) of the second entity received from the second entity, and the second entity verifies the trust information (the first trust information) of the first entity received from the first entity.

Then, in the step S640, the first entity authenticates the second entity by verifying the verification information received from the second entity, and the second entity authenticates the first entity by verifying the verification information received from the first entity. Accordingly, a trust relationship between the first entity and the second entity may be formed.

Hereinafter, each step of the above-described method for forming trust relationship between basic entities will be explained in further detail by referring to FIG. 6.

[The step S610] Each entity generates verification information based on trust information (may correspond to trust information of the entity itself) transferred from an authentication organization.

In this case, the verification information may be a result value of a hash function inputs of which are trust information shared with other entity and a random value generated by it or identity information which can be made public. Or, the verification information may be a result value of electronic signature on a random value generated by using its private key. The private key may correspond to the trust information.

At this time, the verification information may be an output value of a hash function inputs of which are the trust information shared with other entity and a random value generated by itself or identity information which can be made public. Or, the verification information may be an output value which is obtained by making electronic signature on the generated random number or the identity information which can be made public by using its private which may correspond to the trust information.

[The step S620] Each entity exchanges the random number or the identity information which can be made public and the generated verification information.

At this time, when the trust information is a certificate, the trust information which may be trust information of the entity itself may also be transmitted to a counterpart entity.

[The step S630] When the trust information is a certificate, each entity performs verification by asking authentication organization which issued the corresponding trust information of validity and reliability of the trust information of other entity. However, the step S630 may be skipped when the trust information is a symmetric key.

[The step S640] If the step S630 is completed successfully, each entity authenticates each other by verifying verification information of a counterpart entity based on the corresponding trust information, and forms trust relationship between entities.

In this case, the trust information may be a symmetric key (secret key) or an authentication key (public key). If the trust information is a symmetric key, each entity may perform a hash function computation on the random number and the identity information transferred from a counterpart entity, and perform verification on the verification information transferred from the counterpart entity by comparing a result value of the hash function with the verification information transferred from the counterpart entity. If the trust information is an authentication key, each entity may decrypt the verification information transferred from a counterpart entity by using the authentication key, and perform verification on the verification information transferred from the counterpart entity by checking whether a hash value of the random number or the identity information transferred from the counterpart entity is identical to the decrypted value.

In FIG. 6, a pair of entities may be a pair of an eUICC and a device embedding the eUICC, a pair of an eUICC and a SM-SR, a pair of a SM-SR and another SM-SR, a pair of a MNO and a SM-SR, a pair of a MNO and a SM-DP, a pair of a SM-SR and a SM-DP, etc.

Meanwhile, specifically, an example of forming trust relationships between specific entities such as an eUICC, a device embedding the eUICC, a SM-SR, a SM-DP, a MNO, etc. is explained by referring to FIG. 5.

As shown in FIG. 5, a method of forming trust relationships between specific entities such as an eUICC, a device embedding the eUICC, a SM-SR, a SM-DP, a MNO, etc. may comprise a step S510 of forming trust relationship between the eUICC and the device embedding the eUICC, a step S520 of forming trust relationship between the eUICC and the SM-SR, a step S530 of forming trust relationship between SM-SRs, a step S540 of forming trust relationship between the MNO and the SM-SR, a step S550 of forming trust relationship between the MNO and the SM-DP, and a step S560 of forming trust relationship between the SM-SR and the SM-DP. Also, the method may further comprise a step S510 of forming trust relationship between the eUICC and the device embedding the eUICC, a step S540 of forming trust relationship between the MNO and the SM-SR, and a step S550 of forming trust relationship between the MNO and the SM-DP, etc.

1. A Step S510 of Forming Trust Relationship Between the eUICC and the Device Embedding the eUICC Each of the eUICC and the device embedding the eUICC verifies each other based on trust information of a counterpart entity so that the trust relationship between the eUICC and the device may be formed.

More specifically, the eUICC and the device perform reciprocal authentication based on trust information issued for each. For the reciprocal authentication, each entity may ask the corresponding authentication organization of validity and reliability of other entity via on-line (OTA or OTI). However, since the eUICC does not have a communication capability, when the eUICC and the device perform reciprocal authentication, verification on the trust information of the device embedding the eUICC may be performed based on public trust information of the device (for example, a public key of Public Key Cryptography (PK), etc.) which is pre-loaded in the eUICC during the manufacturing or provisioning step of the eUICC). Or, the trust information of the device embedding the eUICC may be verified by communicating with the trust organization via the device embedding the eUICC according to a request of the eUICC.

2. A Step S520 of Forming Trust Relationship Between the eUICC and the SM-SR

Each of the eUICC and the SM-SR authenticates each other by generating its verification information based on trust information transferred from or shared with a counterpart entity, transmitting the generated verification information, and verifying the verification information transmitted from the counterpart entity based on the trust information. Thereby, the trust relationship between the eUICC and the SM-SR is formed.

In the step S520, the trust relationship between the eUICC and the SM-SR may be formed according to a method illustrated in FIG. 6. In a case that the trust relationship between the eUICC and the SM-SR is formed according to the method of FIG. 6, the step S520 will be explained in the following descriptions.

In the step S520, each of the eUICC and the SM-SR may generate, as verification information, an output value of a hash function inputs of which are a random number or identity information which can be made public and the trust information, or a result value of electronic signature computation on the generated random value or the identity information which can be made public by using a private key of each.

Also, in the step S520, each of the eUICC and the SM-SR may transmit, to the counterpart entity, the random number and the identity information which can be made public together with the verification information. Also, each of the eUICC and the SM-SR may additionally transmit the trust information when the trust information is a certificate.

Meanwhile, in the step S520, after each of the eUICC and the SM-SR transmits the verification information to each other, if the trust information is a certificate, each of the eUICC and the SM-SR may verify validity and reliability of the trust information of each other by asking an authentication organization which issued the trust information. Such the verification on the trust information may be omitted if the trust information is a symmetric key.

Then, in the step S520, each of the eUICC and the SM-SR may perform a hash function computation on the random number or the identity information transferred from each other, and authenticates each other by verifying the verification information transferred from each other through comparison between a result value of the hash function and the verification information transferred from each other. Thereby, the trust relationship between the eUICC and the SM-SR may be formed. Or, each entity may decrypt the verification information transferred from each other by using the certificate, and perform verification on the verification information transferred from each other by checking whether an output value of a hash function inputs of which are the random number or the identity information transferred from each other is identical to the decrypted value. Thereby, the trust relationship between the eUICC and the SM-SR may be formed.

3. The Step S530 of Forming a Trust Relationship Between the SM-SRs

Each of the SM-SRs generates verification information based on transferred or share trust information, transmits the generated verification information to each other, and authenticates each other by verifying the trust information transmitted from a counterpart based on the trust information. Thereby, the trust relationship between the SM-SRs may be formed.

In the step S530, the trust relationship between the SM-SRs may be formed according to the method shown in FIG. 6. Or, the trust relationship may also be formed by using a security communication protocol such as TLS/SSL, etc.

When the trust relationship between the SM-SRs is formed according to the method of FIG. 6, the step S530 will be explained in the following descriptions.

In the step S530, each of the SM-SRs may generate, as verification information, an output value of a hash function inputs of which are a random number or identity information which can be made public and the trust information, or a result value of electronic signature computation on the generated random value or the identity information which can be made public by using a private key of each.

Also, in the step S530, each of the SM-SRs may transmit, to the counterpart entity, the random number and the identity information which can be made public together with the verification information. Also, each of the SM-SRs may additionally transmit the trust information when the trust information is a certificate.

Meanwhile, in the step S530, after each of the SM-SRs transmits the verification information to each other, if the trust information is a certificate, each of the SM-SRs may verify validity and reliability of the trust information of each other by asking an authentication organization which issued the trust information. Such the verification on the trust information may be omitted if the trust information is a symmetric key.

Then, in the step S530, each of the SM-SRs may perform a hash function computation on the random number or the identity information transferred from each other, and authenticates each other by verifying the verification information transferred from each other through comparison between a result value of the hash function and the verification information transferred from each other. Thereby, the trust relationship between the SM-SRs may be formed. Or, each entity may decrypt the verification information transferred from each other by using the certificate, and perform verification on the verification information transferred from each other by checking whether an output value of a hash function inputs of which are the random number or the identity information transferred from each other is identical to the decrypted value. Thereby, the trust relationship between the SM-SRs may be formed.

4. The Step S540 of Forming a Trust Relationship Between the MNO and the SM-SR

The MNO authenticates the SM-SR unidirectionally based on the trust information of the SM-SR so that the trust relationship between the MNO and the SM-SR is formed.

In this step, the MNO performs a unidirectional authentication based on the trust information of the SM-SR so that the trust relationship between the MNO and the SM-SR is formed. The reason is that authentication on the MNO is not necessary since MNO is an entity which is trustable to the eUICC and is a source of customer information. However, in some cases, reciprocal authentication may be performed based on certificates of MNOs.

5. The Step S550 of Forming a Trust Relationship Between the MNO and the SM-DP

The MNO authenticates the SM-DP unidirectionally based on the trust information of the SM-DP so that the trust relationship between the MNO and the SM-DP is formed.

In this step, the MNO performs a unidirectional authentication based on the trust information of the SM-DP so that the trust relationship between the MNO and the SM-DP is formed. The reason is that authentication on the MNO is not necessary since MNO is an entity which is trustable to the eUICC and is a source of customer information. However, in some cases, reciprocal authentication may be performed based on certificates of MNOs.

6. The Step S560 of Forming a Trust Relationship Between the SM-SR and the SM-DP Each of the SM-SR and the SM-DP generates verification information based on transferred or share trust information, transmits the generated verification information to each other, and authenticates each other by verifying the trust information transmitted from a counterpart based on the trust information. Thereby, the trust relationship between the SM-SR and the SM-DP may be formed.

In the step S560, the trust relationship between the SM-SR and the SM-DP may be formed according to the method shown in FIG. 6. Or, the trust relationship may also be formed by using a security communication protocol such as TLS/SSL, etc.

When the trust relationship between the SM-SR and the SM-DP is formed according to the method of FIG. 6, the step S560 will be explained in the following descriptions.

In the step S560, each of the SM-SR and the SM-DP may generate, as verification information, an output value of a hash function inputs of which are a random number or identity information which can be made public and the trust information, or a result value of electronic signature computation on the generated random value or the identity information which can be made public by using a private key of each.

Also, in the step S560, each of the SM-SR and the SM-DP may transmit, to the counterpart entity, the random number and the identity information which can be made public together with the verification information. Also, each of the SM-SR and the SM-DP may additionally transmit the trust information when the trust information is a certificate.

Meanwhile, in the step S560, after each of the SM-SR and the SM-DP transmits the verification information to each other, if the trust information is a certificate, each of the SM-SR and the SM-DP may verify validity and reliability of the trust information of each other by asking an authentication organization which issued the trust information. Such the verification on the trust information may be omitted if the trust information is a symmetric key.

Then, in the step S560, each of the SM-SR and the SM-DP may perform a hash function computation on the random number or the identity information transferred from each other, and authenticates each other by verifying the verification information transferred from each other through comparison between a result value of the hash function and the verification information transferred from each other. Thereby, the trust relationship between the SM-SR and the SM-DP may be formed. Or, each entity may decrypt the verification information transferred from each other by using the certificate, and perform verification on the verification information transferred from each other by checking whether an output value of a hash function inputs of which are the random number or the identity information transferred from each other is identical to the decrypted value. Thereby, the trust relationship between the SM-SR and the SM-DP may be formed.

Hereinafter, the above-described method for forming trust relationships between entities will be explained again in view of an eUICC. The technical thoughts are identical to the above-described ones.

Figure 7:
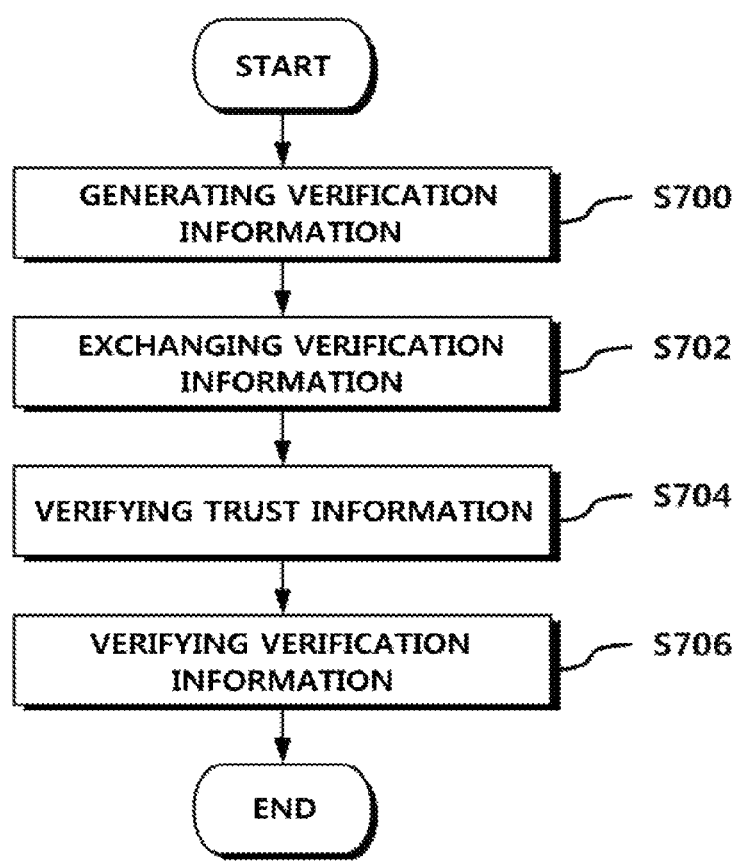
FIG. 7 is a flow chart illustrating a method for forming a trust relationship between an eUICC and a SM-SR in formation of trust relationships between entities in a eUICC environment according to an example embodiment of the present invention.

FIG. 7 is a flow chart illustrating a method for forming a trust relationship between an eUICC and a SM-SR in formation of trust relationships between entities in a eUICC environment according to an example embodiment of the present invention. FIG. 7 illustrates the step S510 of FIG. 5 in further detail in view of an eUICC as a main entity for operation.

Referring to FIG. 7, a method for forming a trust relationship between an eUICC and a SM-SR according to an example embodiment of the present invention may comprise a step S700 of generating, by the eUICC, verification information; a step S702 of transmitting, by the eUICC, the generated verification information to the SM-SR and receiving verification information generated by the SM-SR from the SM-SR; a step S704 of verifying, by the eUICC, trust information; and a step S706 of verifying, by the eUICC, the verification information received from the SM-SR, etc.

In the step S700 of generating verification information, the eUICC generates the verification information based on transferred or shared trust information. At this time, the SM-SR generates the verification information based on transferred or shared trust information in the identical manner.

In the step S702 of exchanging verification information, the eUICC transmits, as information for the SM-SR to authenticate the eUICC, the generated verification information to the SM-SR, and receives the verification information generated by the SM-SR from the SM-SR. At this time, the SM-SR transmits, as information for the eUICC to authenticate the SM-SR, the generated verification information to the eUICC, and receives the verification information generated by the eUICC from the eUICC.

After the step S702 of exchanging verification information, in the step S704 of verifying trust information which can be performed additionally when the trust information is a certificate, the eUICC may verify validity and reliability of the trust information of the SM-SR through a procedure for asking an authentication organization which issued the trust information of the trust information. At this time, the SM-SR may verify validity and reliability of the trust information of the eUICC through a procedure for asking an authentication organization which issued the trust information of the trust information in the identical manner.

The step S704 of verifying trust information may be omitted when the trust information in a symmetric key. In this case, the step S706 of verifying verification information may be performed directly.

In the step S706 of verifying verification information performed after the step S702 or the step S704, the eUICC may authenticate the SM-SR by verifying the verification information received from the SM-SR based on the trust information. At this time, the SM-SR may authenticate the eUICC by verifying the verification information received from the eUICC based on the trust information in the identical manner.

In the above-described step S700 of generating verification information, the eUICC may generate, as the verification information, an output value of a hash function whose inputs are a random number generated by it or identity information which can be made public, and trust information shared with a counterpart entity (SM-SR). Or, in the step S700 of generating verification information, the eUICC may generate, as the verification information, a result value of electronic signature computation performed on a generated random number or identity information which can be made public by using its private key. At this time, the SM-SR may generate its verification information in the identical manner.

In the above-described step S702 of exchanging verification information, the eUICC may transmit, to the SM-SR, the random number or the identity information which can be made public together with the verification information, and receive, from the SM-SR, the random number or the identity information which can be made public together with the verification information generated by the SM-SR. At this time, the SM-SR may transmit and receive the random number or the identity information which can be made public together with the verification information in the identical manner.

Meanwhile, when the trust information is a certificate, in the above-described step S702 of exchanging verification information, the eUICC may additionally transmit the trust information to the SM-S, and receive the trust information of the SM-SR from the SM-SR. At this time, the SM-SR may additionally transmit the trust information to the eUICC and receive the trust information of the eUICC from the eUICC in the identical manner.

In the above-described step S706 of verifying verification information, if the trust information is a symmetric key, the eUICC may perform a hash function computation on the random number and the identity information received from the SM-SR, and authenticates the SM-SR by verifying the verification information transferred from the SM-SR in the step S702 by comparing a result value of the hash function with the verification information transferred from the SM-SR in the step S702. Or, in the above-described step S706 of verifying verification information, if the trust information is a certificate, the eUICC may decrypt the verification information transferred from the SM-SR in the step S702 by using the certificate, and authenticate the SM-SR by verifying the verification information transferred from the SM-SR in the step S702 by checking whether an output value of a hash function whose inputs are the random number or the identity information transferred from the SM-SR is identical to the decrypted value.

Hereinafter, an eUICC, providing the method for forming a trust relationship between an eUICC and a SM-SR which is explained by referring to FIG. 7, will be explained.

FIG. 8 is a block diagram illustrating an eUICC for forming a trust relationship between an eUICC and a SM-SR among formation of trust relationships between entities in an eUICC environment according to an example embodiment of the present invention.

Referring to FIG. 8, an eUICC for forming a trust relationship between an eUICC and a SM-SR may comprise a verification information generating part 810 generating verification information based on transferred or shared trust information; a verification information exchanging part 820 of transmitting the generated verification information to the SM-SR as information to be used by the SM-SR for authenticating the eUICC and receiving verification information generated by the SM-SR from the SM-SR; a verification information verifying part 840 of authenticating the SM-SR by verifying the verification information received from the SM-SR based on the trust information, etc.

The verification information generating part 810 is a part performing the step S700 of generating verification information shown in FIG. 7, and the verification information exchanging part 820 is a part performing the step S702 of exchanging verification information shown in FIG. 7, and the trust information verifying part 830 is a part performing the step S704 of verifying trust information shown in FIG. 7, and the verification information verifying part 840 is a part performing the step S706 of verifying verification information shown in FIG. 7.

The above-described verification information generating part 810 may generate, as the verification information, an output value of a hash function whose inputs are a random number generated by it or identity information which can be made public, and trust information shared with a counterpart entity (SM-SR). Or, the above-described verification information generating part 810 may generate, as the verification information, a result value of electronic signature computation performed on the generated random number or identity information which can be made public by using its private key.

If the trust information is a symmetric key, the verification information verifying part 840 may perform a hash function computation on the random number and the identity information received from the SM-SR, and authenticates the SM-SR by verifying the verification information transferred from the SM-SR by comparing a result value of the hash function with the verification information transferred from the SM-SR. Or, the verification information verifying part 840 may decrypt the verification information transferred from the SM-SR by using the certificate, and authenticate the SM-SR by verifying the verification information transferred from the SM-SR by checking whether an output value of a hash function whose inputs are the random number or the identity information transferred from the SM-SR is identical to the decrypted value.

Meanwhile, referring to FIG. 8, if the trust information is a certificate, an eUICC for forming a trust relationship between an eUICC and a SM-SR may further include a trust information verifying part 830 verifying validity and reliability of the trust information of the SM-SR through a procedure of asking an authentication organization which issued the trust information of the trust information.

If the above-described example embodiment of the present invention is used, a circle of trust having a structure proposed by the GSMA may be formed technically. Also, reliability and stability of the eUICC structure may be enhanced based on the circle of trust.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method for forming a trust relationship between entities under an embedded Universal Integrated Circuit Card (eUICC) environment, the method comprising:
   receiving, by a first entity, trust information and verification information, wherein the verification information is transmitted from a second entity;
   verifying, by the first entity, the verification information of the second entity using the trust information;
   authenticating, by the first entity, the second entity by verifying the verification information; and
   establishing a secure communication channel between the first entity and the second entity,
   wherein the first and second entities include at least one of an eUICC, one or more Subscription Managers (SMs), and one or more Mobile Network Operators (MNOs), and
   wherein the verification information is generated, by the second entity, using at least one of a hash function computation and a random value.

2. The method of claim 1, wherein the trust information is information assigned to an entity having a right to participate in a trust relationship.

3. The method of claim 1, wherein the verification information is generated with a purpose of certificating each entity.

4. The method of claim 1, wherein the trust information is issued by an authentication organization communicating with the entities.

5. The method of claim 1, wherein the secure communication channel is established based on a transport layer security protocol.

6. The method of claim 1, wherein the Subscription Manager includes one or more Subscription Manager-Secure Routings (SM-SRs) and one or more Subscription Manager-Data Preparations (SM-DPs).

7. An embedded Universal Integrated Circuit Card (eUICC) configured to form a trust relationship with an entity under an eUICC environment including at least one entity, the eUICC comprising:
   processor configured to receive trust information and verification information, the verification information being transmitted from the entity and to authenticate the entity by verifying the verification information using the trust information,
   wherein the eUICC establishes a secure communication channel with the entity, and wherein the entity includes at least one of one or more Subscription Managers (SMs) and one or more Mobile Network Operators, and wherein the verification information is generated, by the entity, using at least one of a hash function computation and a random value.

8. The eUICC of claim 7, wherein the trust information is information assigned to an entity having a right to participate in a trust relationship.

9. The eUICC of claim 7, wherein the verification information is generated with a purpose of certificating each entity.

10. The eUICC of claim 7, wherein the trust information is issued by an authentication organization communicating with the at least one entity.

11. The eUICC of claim 7, wherein the secure communication channel is established based on a transport layer security protocol.

12. The eUICC of claim 7, wherein the Subscription Manager includes one or more Subscription Manager-Secure Routings (SM-SRs) and one or more Subscription Manager-Data Preparations (SM-DPs).

13. The method of claim 1, wherein the verification information is at least one certificate of the second entity.

14. The method of claim 1, wherein the first entity is the eUICC.

15. The method of claim 1, wherein the second entity is a Subscription Manager.

16. The eUICC of claim 10, wherein the verification information is at least one certificate of the entity.

17. The eUICC of claim 10, wherein the entity is a Subscription Manager.

18. The method of claim 1, wherein the second entity is a subscription manager (SM) and the first entity is the eUICC and wherein the verification information is a key or a signature and the trust information is at least one certificate.

* * * * *